April 21, 1959  S. C. JORDAN  2,883,506
THERMOSTATIC CONTROL SYSTEM
Filed Dec. 20, 1956
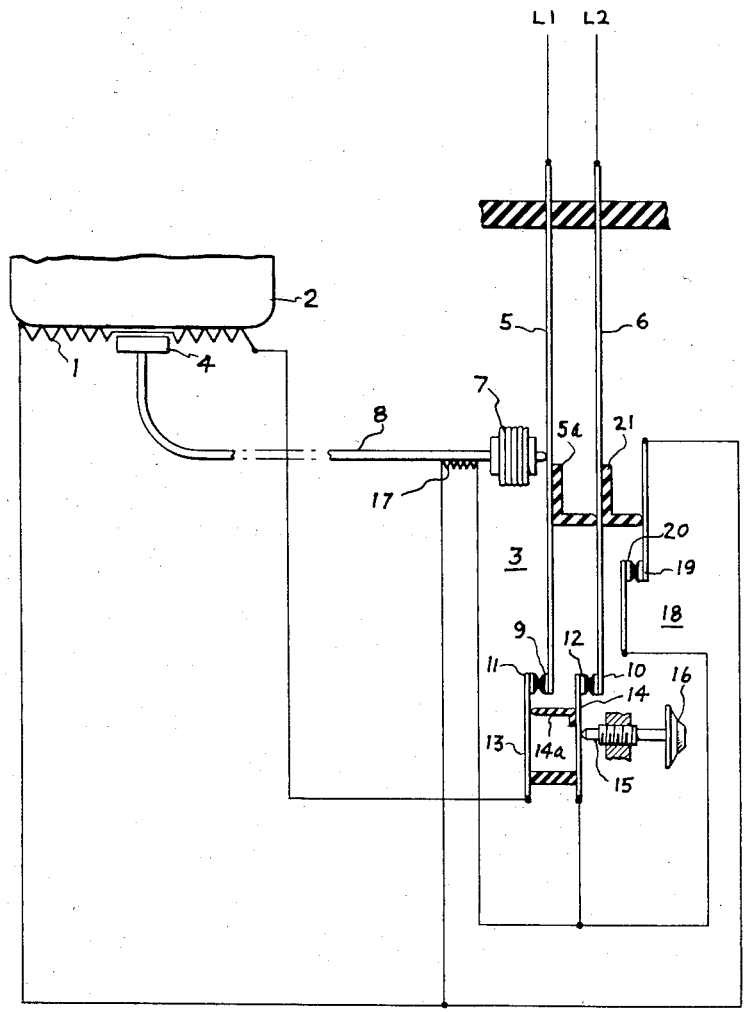
INVENTOR.
SAMUEL C. JORDAN
BY
HIS ATTORNEY

… … …

United States Patent Office 2,883,506
Patented Apr. 21, 1959

2,883,506

THERMOSTATIC CONTROL SYSTEM

Samuel C. Jordan, Lyndon, Ky., assignor to General Electric Company, a corporation of New York Application December 20, 1956, Serial No. 629,498

2 Claims. (Cl. 219—20)

This invention relates to thermostatic control systems for electric heating units, and more particularly to a control system adapted to regulate the energization of a range surface cooking unit.

A principal object of this invention is to provide an automatic surface cooking unit adapted to provide a plurality of heat output rates for boiling operations as well as accurate temperature regulation in the range of temperatures required for frying operations.

Another object of this invention is to provide a thermostatic control system for an automatic surface cooking unit including an auxiliary heating element arranged to provide a compensating signal during frying operations and also a heat output control signal during boiling operations.

Further objects and advantages of the invention will become apparent as the following description proceeds, and the features of novelty which characterize the invention will be pointed out with particularity in the claims annexed to and forming a part of this specification.

Briefly stated, in accordance with one aspect of this invention there is provided thermostatic control means for regulating the energization of a surface cooking unit in accordance with the temperature of a utensil heated thereby, an auxiliary heater for supplying a compensating signal to the thermostatic means, and means for rendering the auxiliary heater ineffective until the temperature of the utensil approaches the boiling point of water and thereafter effective throughout the temperature range required for boiling and frying operations.

For a better understanding of this invention, reference may be made to the following description and the accompanying drawing in which the single figure is a diagrammatic view of an automatic surface heating unit system arranged in accordance with the present invention.

Referring to the drawing, the numeral 1 designates a resistance heating unit arranged to support a cooking utensil 2. Heating unit 1 is energized from a source of electric power represented by supply lines L1, L2 and its energization is automatically controlled, in accordance with temperature variations of utensil 2, by a thermostat (generally designated by the numeral 3) which is hydraulically connected to a thermostatic bulb 4 adapted to rest in heat transfer relation with utensil 2.

Thermostat 3 includes a pair of contact carrying arms 5 and 6 arranged in spaced relation by spaces 5a secured to arm 5 and actuated by thermostatic bellows 7 which is connected to bulb 4 by a tube 8, so that bellows 7 expands and contracts in accordance with changes in the temperature of utensil 2. Arms 5 and 6 carry movable contacts 9 and 10 respectively, which cooperate with mating contacts 11 and 12 mounted on the free ends of arms 13 and 14 respectively. Arms 13 and 14 are maintained in spaced relation by spacer 14a and may be positioned by setting screw 15 which is provided with a control knob 16 having temperature markings corresponding to the temperature range within which cooking operations are conducted (i.e., 150° F. to 450° F.). It will be evident that control knob 16 provides manually operable means for setting the temperature of thermostat 3, inasmuch as rotary movement of knob 16 results in movement of contacts 11 and 12 through a range of positions corresponding to the various temperature settings required during the cooking operations.

In order to provide the different boiling rates required for the various types of water cooking operations, and also to provide an auxiliary temperature signal useful in accurate control during frying operations, I utilize an auxiliary heating unit 17 arranged in heat transfer relation with bellows 7 and connected in series with heating unit 1. The heat output of heater 17 is, of course, needed to supply a periodic signal to thermostat 3 during boiling operations because there is no variation in the signal produced by bulb 4 so long as boiling continues. Under these conditions the cycling of contacts 9, 11 and 10, 12 between open and closed positions is dependent on the heat supplied by auxiliary heater 17, and the duration of the periods of energization of heater 17 is dependent on the settnig of knob 16. Thus, if knob 16 is set at 215° F. the cycling rate will be such that the boiling rate is barely maintained, while a higher setting, e.g., 235° F., will produce a more vigorous boiling rate. Hence it will be seen that heating unit 1 may be energized at various heat output rates, ranging from a rate barely sufficient to maintain boiling to one in which the heating unit is energized continuously.

Heater 17 also performs a useful function during frying operations because the temperature of bulb 4 tends to lag behind the temperature of utensil 2, and also because even after the heating circuit is de-energized, the stored heat in heating unit 1 may cause overheating of utensil 2. Thus, it is desirable to de-energize heating unit 1 somewhat before bulb 4 reaches the preset frying temperature, and heater 17 effectively performs this function. However, during the heating of large water loads the additional heat signal from heater 17 causes premature de-energization of heating unit 1, and as a result the cooking load may not be brought to a boil on the first energization cycle. In order to overcome this difficulty, there is provided a shorting switch 18 including contacts 19 and 20 actuated by an actuator member 21 secured to thermostat arm 6. Thus it will be seen that contacts 19 and 20 may be opened at a preset temperature of bulb 4 irrespective of the temperature setting of the thermostat in accordance with the position of knob 16, and that these contacts will close whenever the temperature of bulb 4 is below that preset temperature. Shorting switch contacts 19 and 20 are connected in parallel with heater 17 so that it may be energized only if these contacts are open. Shorting switch 18 is arranged so that its contacts open when the temperature of bulb 4 approaches the boiling point of water, and preferably are arranged to open when this temperature is in the range between 185° F. and 195° F. By this means, energization of heater 17 is begun only as the boiling point is approached (in the case of water loads) and, of course, well in advance of the achievement of frying temperatures which range upwardly from 300° F.

Briefly reviewing the operation of this invention, it will be seen that if a heavy water load (such as a large cooking utensil containing sufficient water for boiling spaghetti) is to be brought to a boil, heater 17 remains de-energized during the initial heating cycle until the boiling temperature is approached, and is not energized for a sufficiently long period of time to cause premature opening of the main thermostat contacts. Under these conditions, however, it does function to regulate the heat input to utensil 2 after the boiling point is reached if knob 16 is set at a temperature corresponding to a boiling rate which does not require continuous energization of the heating unit. If a light water load (such as a small utensil containing water and vegetables) is being heated, it will be evident that heater 17 will have little effect on the cooking operation unless the thermal mass of the utensil 2 and its contents is extremely low in which case the additional heat output from heater 17 may cause contacts 9, 10, 11 and 12 to open slightly prematurely and thus prevent over heating and perhaps scorching of the food. During frying operations, knob 16 will be set at a temperature in the range between 300° F. and 450° F., and hence heater 17 will be energized during the period that bulb 4 rises from a temperature of approximately 190° until the contacts of thermostat 3 open. Hence, it will be seen that the energization of heater 17 will begin sufficiently early to provide a substantial "anticipator" signal effective to de-energize heater 1 somewhat before bulb 4 reaches the desired frying temperature.

It will be recognized by those skilled in the art that the present invention may be utilized in thermostatic control systems other than those of the bulb and bellows type, such as one in which a thermistor sensing device transmits an electrical signal to a heating unit control device, and also that in some instances the auxiliary signal producing means may be arranged to supply periodic signals at regular intervals independent of the energization cycle of the heating unit power circuit.

While I have shown and described a particular embodiment of my invention, I do not desire the invention to be limited to the particular construction disclosed, and I intend by the appended claims to cover all modifications within the true spirit and scope of my invention.

What I claim as my invention is:

1. An automatic control system for an electric surface heating unit comprising a thermostatic bulb adapted to rest in the heat transfer relation with a utensil heated by said heating unit, a thermostat including manually adjustable temperature setting means, first switch means adapted to connect said heating unit to an electric power source, pressure actuated means hydraulically connected to said bulb for periodically actuating said first switch means in response to changes in the temperature of said utensil, a heating element arranged in heat transfer relation with said pressure actuated means and connected in series with said heating unit so as to be energizable simultaneously therewith, and second switch means connected in parallel with said heating element, said second switch means being in closed position at room temperature and operatively associated with said pressure actuated means so as to be actuated thereby to open position only when the temperature of said bulb exceeds a predetermined temperature below the boiling point of water.

2. An automatic control system in accordance with claim 1 in which said predetermined temperature is between 185° F. and 195° F.

References Cited in the file of this patent
UNITED STATES PATENTS

| | | |
|---|---|---|
| 1,697,040 | Appelberg | Jan. 1, 1929 |
| 2,410,014 | Clark | Oct. 29, 1946 |
| 2,549,461 | Haller | Apr. 17, 1951 |
| 2,611,850 | Walton | Sept. 23, 1952 |
| 2,727,973 | Collins | Dec. 20, 1955 |
| 2,767,293 | Jordan et al. | Oct. 16, 1956 |
| 2,790,057 | Schauer | Apr. 23, 1957 |
| 2,816,203 | Weeks | Dec. 10, 1957 |